United States Patent
Sato et al.

(10) Patent No.: US 10,079,098 B2
(45) Date of Patent: Sep. 18, 2018

(54) CASE-MOLD-TYPE CAPACITOR AND METHOD FOR PRODUCING SAME

(71) Applicant: PANASONIC INTELLECTUAL PROPERTY MANAGEMENT CO., LTD., Osaka (JP)

(72) Inventors: Shinya Sato, Osaka (JP); Toshihisa Miura, Toyama (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 0 days.

(21) Appl. No.: 15/789,899

(22) Filed: Oct. 20, 2017

(65) Prior Publication Data

US 2018/0040425 A1   Feb. 8, 2018

Related U.S. Application Data

(62) Division of application No. 14/648,662, filed as application No. PCT/JP2013/006969 on Nov. 27, 2013, now Pat. No. 9,824,823.

(30) Foreign Application Priority Data

Dec. 10, 2012  (JP) ................. 2012-269055
Dec. 10, 2012  (JP) ................. 2012-269056

(51) Int. Cl.
H01G 4/236   (2006.01)
H01G 2/10    (2006.01)
(Continued)

(52) U.S. Cl.
CPC ............. *H01G 4/236* (2013.01); *H01G 2/04* (2013.01); *H01G 2/10* (2013.01); *H01G 2/103* (2013.01);
(Continued)

(58) Field of Classification Search
CPC .......... H01G 4/224; H01G 4/228; H01G 4/06; H01G 4/005; H01G 4/236; H01G 13/003;
(Continued)

(56) References Cited

U.S. PATENT DOCUMENTS 5,642,255 A    6/1997  Suzuki et al.
6,498,712 B1  12/2002  Ditlya
(Continued)

FOREIGN PATENT DOCUMENTS

JP    60-124907 A    7/1985
JP    60-129412 A    7/1985
(Continued)

OTHER PUBLICATIONS

International Search Report issued in corresponding International Patent Application No. PCT/JP2013/006969, dated Jan. 28, 2014; 3 pages with English translation.
(Continued)

*Primary Examiner* — David M Sinclair
(74) *Attorney, Agent, or Firm* — McDermott Will & Emery LLP

(57) ABSTRACT

A case-mold-type capacitor includes a capacitor element, first and second bus bars connected to the first and second electrodes of the capacitor element, a case accommodating the capacitor element and the first and second bus bars, and a mold resin filling the case therein. The case has a cutaway portion provided therein. A sealing plate joined to the case so as to seal the cutaway portion. The first and second bus bars pass through the sealing plate and are fixed to the sealing plate. The case-mold-type capacitor improves dimensional accuracy between terminal portions of the first and second bus bars without increasing material cost, and has high reliability.

5 Claims, 15 Drawing Sheets

(51) Int. Cl.
  *H01G 4/228*  (2006.01)
  *H01G 13/00*  (2013.01)
  *H01G 4/224*  (2006.01)
  *H01G 2/04*   (2006.01)
  *H01G 4/005*  (2006.01)
  *H01G 4/06*   (2006.01)

(52) U.S. Cl.
  CPC .............. *H01G 4/005* (2013.01); *H01G 4/06* (2013.01); *H01G 4/224* (2013.01); *H01G 4/228* (2013.01); *H01G 13/003* (2013.01); *H01G 13/006* (2013.01); *Y10T 29/51* (2015.01)

(58) Field of Classification Search
  CPC .......... H01G 13/06; H01G 2/10; H01G 2/103; H01G 2/04
  See application file for complete search history.

(56) References Cited

U.S. PATENT DOCUMENTS

| | | | | |
|---|---|---|---|---|
| 8,670,223 | B2* | 3/2014 | Imamura | H01G 2/04 361/323 |
| 2006/0050468 | A1 | 3/2006 | Inoue et al. | |
| 2008/0121386 | A1 | 5/2008 | Hakamata et al. | |
| 2009/0059467 | A1* | 3/2009 | Grimm | H01G 4/224 361/301.5 |
| 2010/0000089 | A1* | 1/2010 | Yang | H01G 2/04 29/854 |
| 2010/0128410 | A1* | 5/2010 | Lee | H01G 2/04 361/274.3 |
| 2013/0222967 | A1* | 8/2013 | Imamura | H01G 2/04 361/301.3 |

FOREIGN PATENT DOCUMENTS

| | | | | |
|---|---|---|---|---|
| JP | 3-67332 | A | 10/1991 | |
| JP | 03-234011 | | 10/1991 | |
| JP | 10-022779 | A | 1/1998 | |
| JP | 11-204382 | A | 7/1999 | |
| JP | 2002-324727 | A | 11/2002 | |
| JP | 2007-281882 | A | 10/2007 | |
| JP | 2008-261550 | A | 10/2008 | |
| JP | 2009-105108 | A | 5/2009 | |
| JP | 2009-111158 | A | 5/2009 | |
| JP | 2009099884 | A * | 5/2009 | ............. H01G 4/228 |
| JP | 4296886 | A | 7/2009 | |
| JP | 2009-177055 | A | 8/2009 | |
| JP | 2009-247243 | A | 10/2009 | |
| JP | 2010-093057 | A | 4/2010 | |
| JP | WO 2010067514 | A1 * | 6/2010 | ............... H01G 2/04 |
| JP | 2010-166013 | A | 7/2010 | |
| JP | 2010-182914 | A | 8/2010 | |
| JP | 2010-251400 | A | 11/2010 | |
| JP | 2011-096750 | A | 5/2011 | |
| JP | 2011-155138 | A | 8/2011 | |
| JP | WO 2012098622 | A1 * | 7/2012 | ............... H01G 2/04 |

OTHER PUBLICATIONS

Non-Final Office Action issued in U.S. Appl. No. 14/648,662, dated Sep. 23, 2016.

Final Office Action issued in U.S. Appl. No. 14/648,662, dated Apr. 13, 2017.

Notice of Allowance issued in U.S. Appl. No. 14/648,662, dated Sep. 7, 2017.

* cited by examiner

CASE-MOLD-TYPE CAPACITOR AND METHOD FOR PRODUCING SAME

RELATED APPLICATIONS

This application is a Divisional application of U.S. patent application Ser. No. 14/648,662, filed on May 29, 2015, which is a U.S. National Stage under 35 U.S.C. § 371 International Patent Application No. PCT/JP2013/006969 filed on Nov. 27, 2013, which claims the benefit of foreign priority of Japanese Patent Applications Nos. 2012-269055 and No. 2012-269056 both filed on Dec. 10, 2012, the contents of which are incorporated herein by reference.

TECHNICAL FIELD

The present invention relates to a case-mold-type capacitor used in various electronic devices, electrical devices, industrial devices, automobiles, and the like, and, in particular, suitable for smoothing and for a filter and a snubber in an inverter circuit for driving a motor of a hybrid automobile, and to a method for manufacturing the capacitor.

BACKGROUND ART

In recent years, from the viewpoint of environmental protection, any electrical devices have been controlled by an inverter circuit for promoting energy saving and achieving high efficiency. Particularly, in the automobile industry, technologies, which are eco-friendly and relate to energy saving and high efficiency, have been developed actively. For example, a hybrid electric vehicle (hereinafter, referred to as "HEV"), which runs on an electric motor and an engine, has been introduced into the market.

Since a range of working voltage of electric motors used in HEVs is as high as several hundred volts, as capacitors used for such motors, much attention has been paid to metallized film capacitors having electrical characteristics of high withstand voltage and low loss. Furthermore, also in response to the market demand for maintenance-free products, metallized film capacitors having an extremely long life-time have been tended to be employed.

A metallized film capacitor used for HEVs is required to have external-environmental resistance, such as moisture resistance and heat resistance, for the reason of, for example, places to be disposed. Therefore, in general, the metallized film capacitor is used in a state in which plural metallized film capacitors connected in parallel with bus bars is stored in a case, and mold resin is input into the case. The mold resin input in this way protects the metallized film capacitors from infiltration by moisture or influence by heat from the outside.

A conventional configuration of a case-mold-type capacitor housing such a metallized film capacitor is described using a case-mold-type capacitor disclosed in PTL 1 as an example. FIG. 12 is a perspective view of the case-mold-type capacitor disclosed in PTL 1.

In case-mold-type capacitor 101, bus bars 102, 103, 104, and 105 made of, for example, copper plates are connected to both edge surfaces of a metallized film capacitor element, and the metallized film capacitor element and bus bars 102, 103, 104, and 105 are accommodated in a housing portion of case 106 having an upper surface opening. The housing portion of case 106 is filled with mold resin 107, so that the metallized film capacitor element is protected from outer environment.

In ordinary usage, case-mold-type capacitor 101 is housed in the metal case, and connected to other components separately housed. Therefore, bus bars 102, 103, 104, and 105 connected to the other component are required to be disposed with high dimensional accuracy. In particular, it becomes important to improve dimensional accuracy between the adjacent bus bars (between bus bar 102 and bus bar 103, and between bus bar 104 and bus bar 105). However, it is difficult to dispose bus bars 102, 103, 104, and 105 to the same positions without error, and it is difficult to unify all the distances between adjacent bus bars in plural case-mold-type capacitors 101.

In order to solve this problem, PTL 2 discloses the following structure. FIG. 13A shows bus bar 201 disclosed in PTL 2. FIG. 13B shows a metallized film capacitor element and bus bar 201 housed in case 202 disclosed in PTL 2.

As shown in FIG. 13A, bus bar 201 includes common connection portion 203 between terminal portions 201a and 201b for external connection of bus bar 201. Bus bar 201 including common connection portion 203 is attached to a metallized film capacitor element, and then housed in case 202 together with the metallized film capacitor element, as shown in FIG. 13B. Finally, case 202 is filled with mold resin 204, and common connection portion 203 is cut off and removed with a jig, such as a nipper. Thus, a case-mold-type capacitor is completed.

That is to say, in a technique disclosed in PTL 2, instead of attaching independently separated bus bars to the metallized film capacitor element, bus bar 201 in which terminal portions 201a and 201b are integrated by common connection portion 203 is attached to the metallized film capacitor element, and common connection portion 203 is then cut off and removed with a cutting tool, such as a nipper. Thus, conventional errors in dimensional accuracy between terminals, occurring when independently separated bus bars are attached to the metallized film capacitor element, are suppressed.

CITATION LIST

Patent Literature

PTL 1: Japanese Patent Laid-Open Publication No. 2009-105108

PTL 2: Japanese Patent Laid-Open Publication No. 11-204382

SUMMARY

A case-mold-type capacitor includes a capacitor element, first and second bus bars connected to the first and second electrodes of the capacitor element, a case accommodating the capacitor element and the first and second bus bars, and a mold resin filling the case therein. The case has a cutaway portion provided therein. A sealing plate joined to the case seals the cutaway portion. The first and second bus bars pass through the sealing plate and are fixed to the sealing plate.

The case-mold-type capacitor improves dimensional accuracy between terminal portions of the first and second bus bars without increasing material cost, and has high reliability.

DETAIL DESCRIPTION OF PREFERRED EMBODIMENTS

Exemplary Embodiment 1

Figure 1:
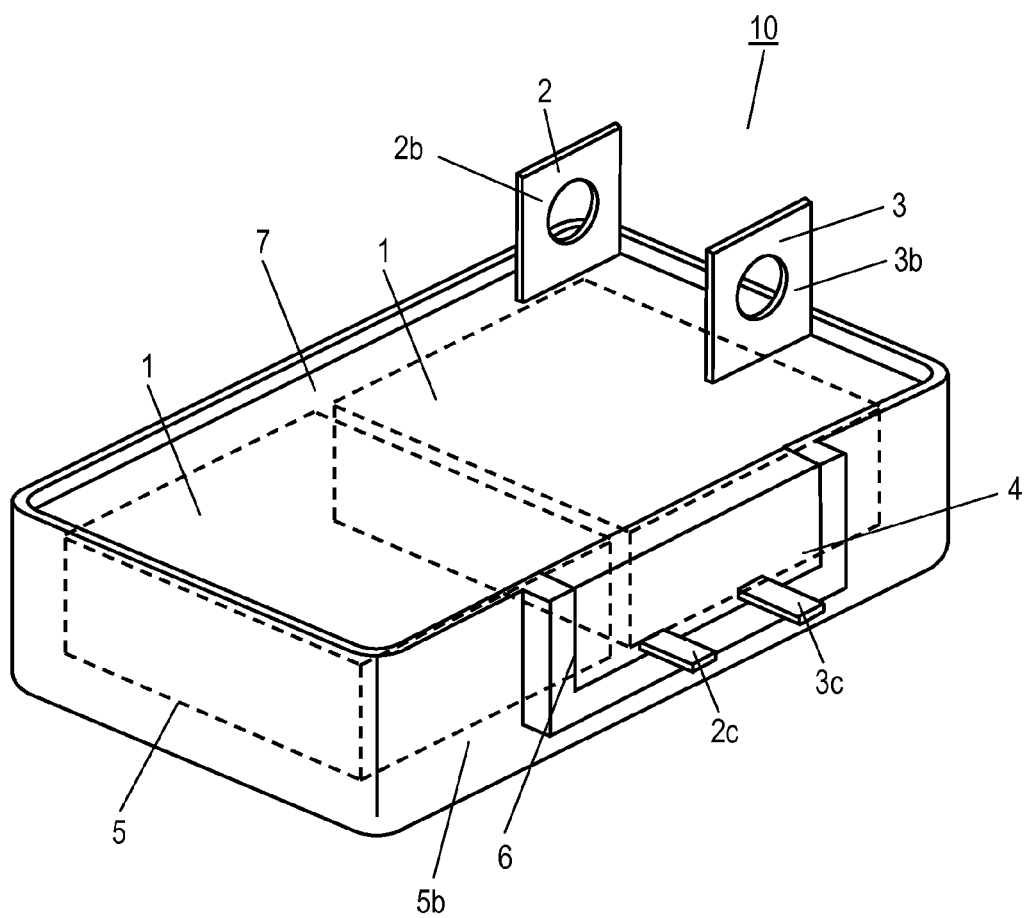
FIG. 1 is a perspective view of a case-mold-type capacitor in accordance with Exemplary Embodiment 1 of the present invention.

FIG. 1 is a perspective view of case-mold-type capacitor 10 in accordance with Exemplary Embodiment 1 of the present invention. Case-mold-type capacitor 10 includes case 5, capacitor element 1 housed in case 5, mold resin 7 filled into case 5 so as to cover capacitor element 1, and bus bars 2 and 3 electrically connected to capacitor element 1. Bus bar 2 includes terminal portions 2b and 2c exposed to the outside of case 5. Bus bar 3 includes terminal portions 3b and 3c exposed to case 5.

Figure 2:
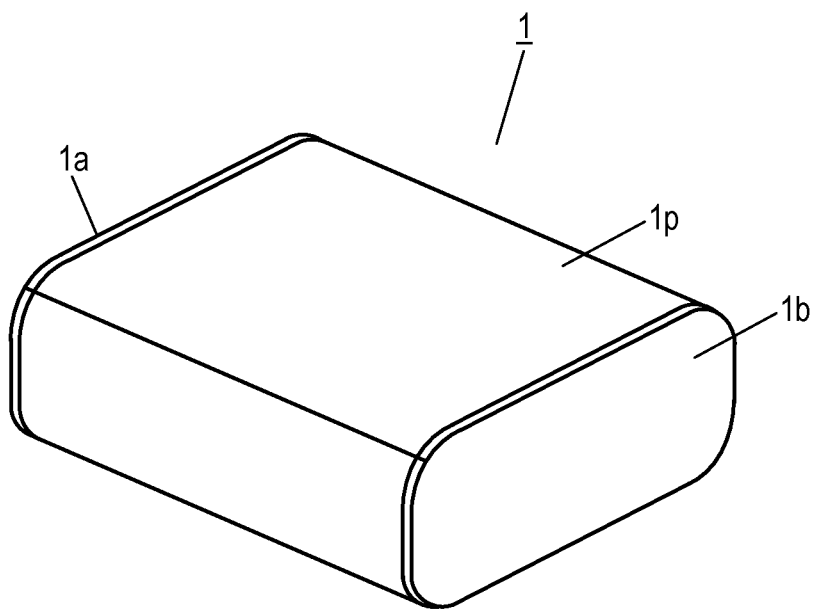
FIG. 2 is a perspective view of a metallized film capacitor element of the case-mold-type capacitor in accordance with Embodiment 1.

FIG. 2 is a perspective view of capacitor element 1. Capacitor element 1 includes capacitor element body 1p and electrodes 1a and 1b provided on capacitor element body 1p. Capacitor element 1 in accordance with Embodiment 1 is a metallized film capacitor element, and is formed by pressing a pair of wound metallized films into a flat shape from upper and lower sides thereof. The metallized films include a dielectric film made of, for example, polypropylene, and a metal vapor-deposition electrode provided on either or both of the surfaces of the dielectric film. Pair of metallized films are wound such that the metal vapor-deposition electrodes face each other across the dielectric film. Electrodes 1a and 1b are sprayed-metal electrodes produced by thermally spraying zinc onto both edge surfaces of capacitor element body 1p. Electrodes 1a and 1b are a pair of lead-out electrodes of P-pole electrode and N-pole electrode.

Figure 3A:
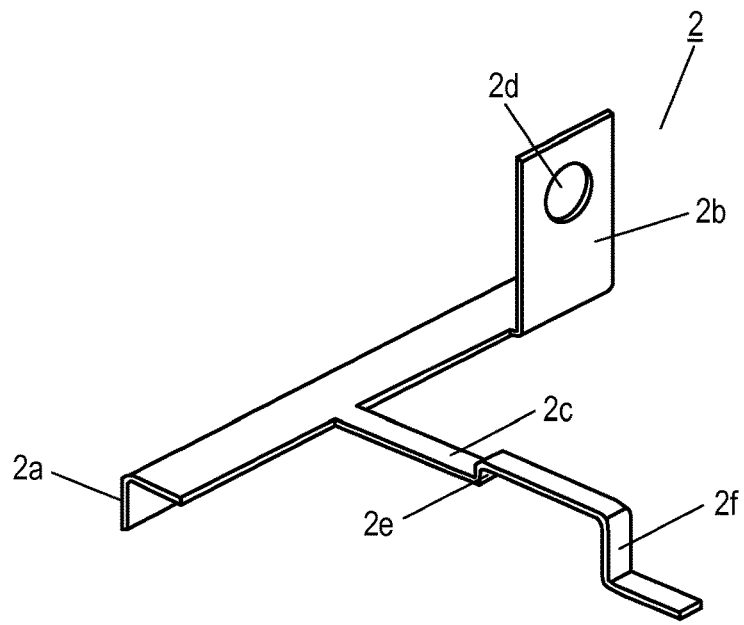
FIG. 3A is a perspective view of a first bus bar of the case-mold-type capacitor in accordance with Embodiment 1.
Figure 3B:
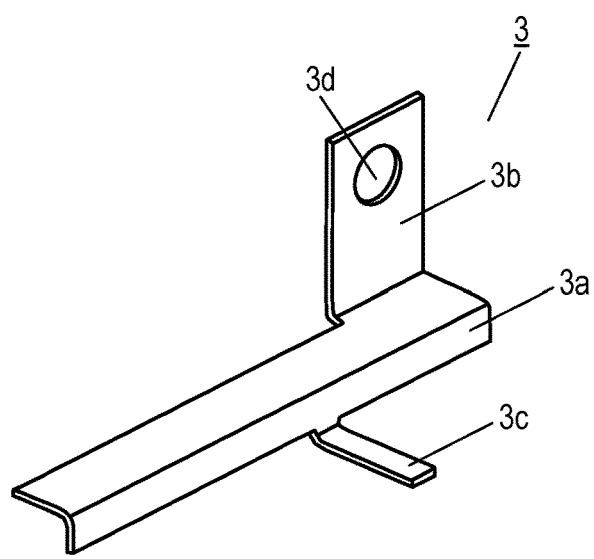
FIG. 3B is a perspective view of a second bus bar of the case-mold-type capacitor in accordance with Embodiment 1.

FIGS. 3A and 3B are perspective views of bus bars 2 and 3, respectively. Bus bars 2 and 3 are connected to electrodes 1a and 1b of capacitor element 1 shown in FIG. 2, respectively.

Firstly, bus bar 2 for electrically leading out electrode 1a to the outside will described with reference to FIG. 3A.

Bus bar 2 includes connection portion 2a directly connected to electrode 1a of capacitor element 1, and terminal portions 2b and 2c connected to connection portion 2a configures to be connected to an external device. Connection portion 2a and terminal portions 2b and 2c of bus bar 2 are integrally formed with each other with a copper plate.

Connection portion 2a is formed by bending a flat plate having a rectangular shape substantially at a middle of a short side perpendicularly to have a cross section having an L-shape, and extends in a direction of a long side of the rectangular plate. A surface of an inner half of connection portion 2a bent in the L-shape contacts electrode 1a of capacitor element 1. In accordance with Embodiment 1, as mentioned later, electrodes 1a of plural capacitor elements 1 are connected to connection portion 2a.

Terminal portion 2b for external connection configured to be connected to the external device has a flat-plate shape. A current from the outside flows to capacitor element 1 via terminal portion 2b. A bolt is inserted into through-hole 2d provided in a middle of terminal portion 2b to fasten terminal portion 2b and a connection portion of the external device together. Thus, terminal portion 2b and the external device are electrically connected to each other.

Terminal portion 2c for external connection configured to be connected to an external device has a flat-plate shape thinner and longer than terminal portion 2b. Terminal portion 2c can be used for allowing a small current to flow from bus bar 2 to the external device and measuring a voltage applied to capacitor element 1. Bus bar 2 has bent portion 2e which is provided for a part of terminal portion 2c and bent to be projected upward. Bus bar 2 has cranked portion 2f provided in terminal portion 2c, linked to bent portion 2e, and bent in a cranked shape.

Next, bus bar 3 for electrically leading out electrode 1b to the outside will be described below with reference to FIG. 3B.

Bus bar 3 includes connection portion 3a directly connected to electrode 1b of capacitor element 1 and terminal portions 3b and 3c connected to connection portion 3a configured to be connected to the external device. Connection portion 3a is formed by bending a flat plate having a rectangular shape substantially at a middle of a short side of the rectangular shape perpendicularly to have a cross section having an L-shape, and extends in a direction of a long side of the rectangular shape. A surface of an inner half of connection portion 3a bent in the L-shape is contacts electrode 1b of capacitor element 1. Similarly to connection portion 2a of bus bar 2, in accordance with Embodiment 1, electrodes 1b of plural capacitor elements 1 are connected to connection portion 3a.

Terminal portion 3b for external connection configured to be connected to the external device has a flat-plate shape. A current from the outside flows to capacitor element 1 via terminal portion 3b. A bolt is inserted into through-hole 3d provided in a middle of terminal portion 3b to fasten terminal portion 3b and the connection portion of the external device together. Thus, terminal portion 3b and the external device are electrically connected to each other.

Terminal portion 3c for external connection configured to be connected to the external device has a flat-plate shape thinner than terminal portion 3b. Terminal portion 3c can be used for allowing a small current to flow from bus bar 3 to the external device and measuring a voltage applied to capacitor element 1.

Figure 4A:
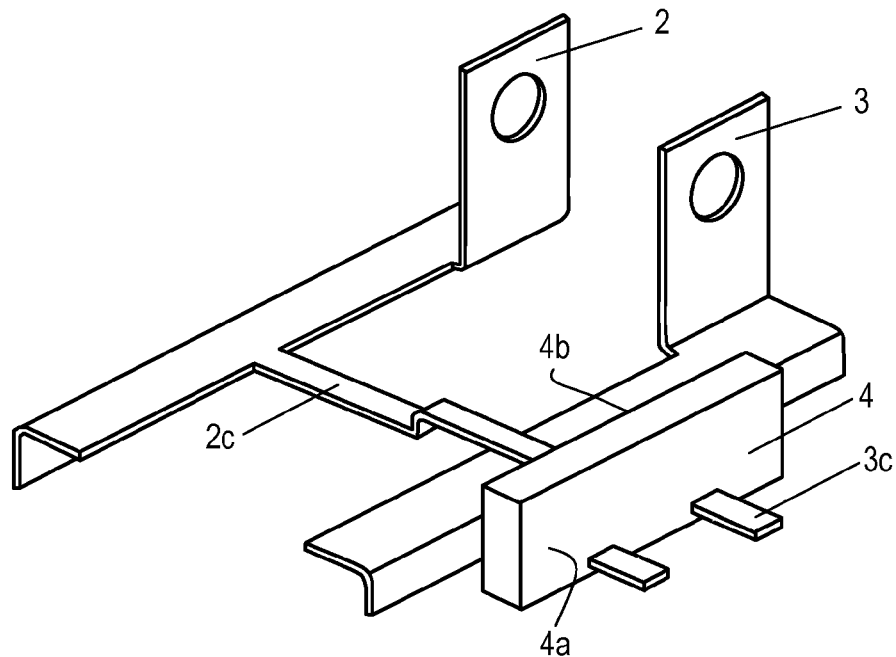
FIG. 4A is a perspective view of the bus bars and a sealing plate of the case-mold-type capacitor in accordance with Embodiment 1.

FIG. 4A is a perspective view of bus bars 2 and 3 fixed to sealing plate 4. Sealing plate 4 has main surfaces 4a and 4b opposite to each other. As shown in FIG. 4A, terminal portions 2c and 3c are fixed to sealing plate 4 such that terminal portions 2c and 3c pass through sealing plate 4 through main surface 4b and main surface 4a.

Terminal portions 2c and 3c of bus bars 2 and 3 are joined to sealing plate 4 by insert-molding. That is to say, bus bars 2 and 3 are disposed in a predetermined die, and resin as material for sealing plate 4 is injected into the die and solidified. Thus, sealing plate 4 is joined to terminal portions 2c and 3c of bus bars 2 and 3, and terminal portions 2c and 3c of bus bars 2 and 3 are fixed to sealing plate 4. In accordance with Embodiment 1, polyphenylene sulfide (PPS) is used as the material for sealing plate 4.

Figure 4B:
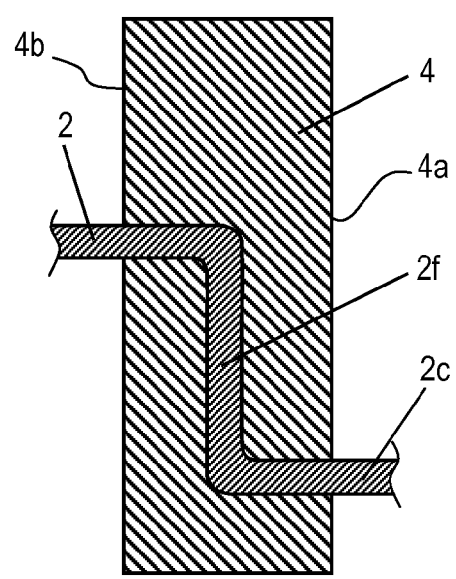
FIG. 4B is a sectional view of the sealing plate of the case-mold-type capacitor shown in FIG. 4A.

FIG. 4B is a sectional view of sealing plate 4, and particularly shows a portion through which bus bar 2 passes. As shown in FIG. 4B, sealing plate 4 fixes bus bar 2 such that cranked portion 2f of terminal portion 2c of bus bar 2 is embedded in sealing plate 4. Therefore, solidified sealing plate 4 does not move in a direction in which terminal portion 2c of bus bar 2 extends, and bus bar 2 is completely fixed to sealing plate 4. In case-mold-type capacitor 10 in accordance with Embodiment 1, bus bar 3 does not have a cranked portion. However, bus bar 3 may have a cranked portion to be embedded in sealing plate 4. In this case, bus bar 3 is also completely fixed to sealing plate 4.

Sealing plate 4 constitutes a part of a side surface of case 5 and seals case 5.

Figure 5:
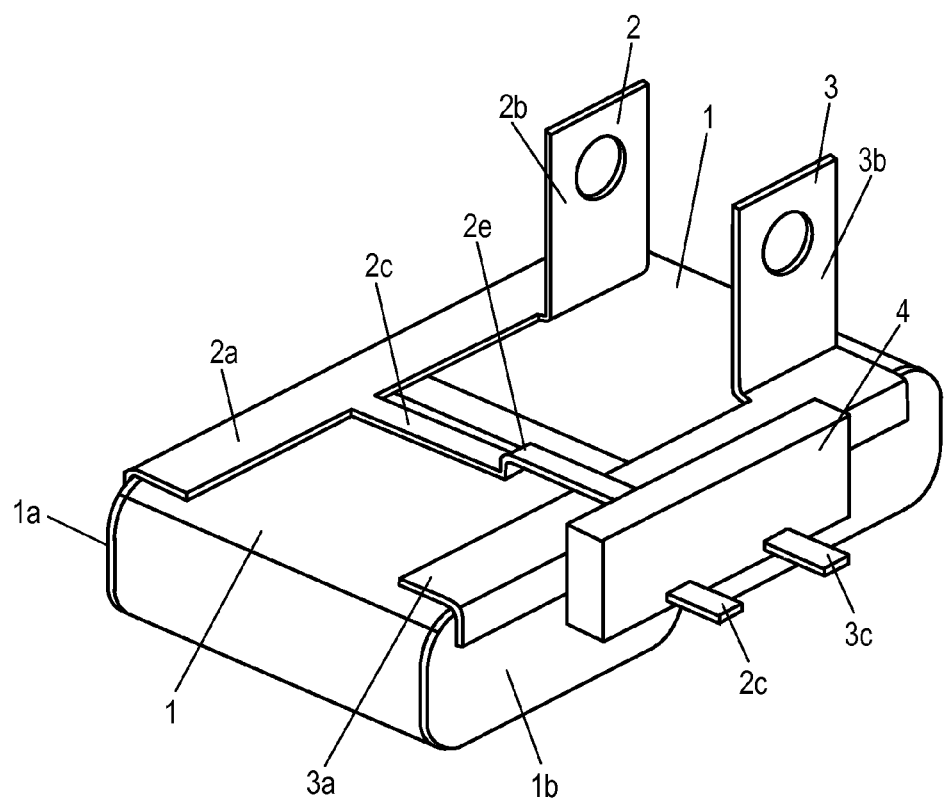
FIG. 5 is a perspective view of a capacitor element of the case-mold-type capacitor in accordance with Embodiment 1.

FIG. 5 is a perspective view of capacitor elements 1 to which bus bars 2 and 3 are connected. Bus bars 2 and 3 to which sealing plate 4 is joined are connected to plural capacitor elements 1, as shown in FIG. 5. In accordance with Embodiment 1, two capacitor elements 1 are connected in parallel to each other with bus bars 2 and 3.

Since bus bars 2 and 3 are fixed to sealing plate 4, tip ends of terminal portions 2c and 3c can be separated from each other by a predetermined distance, and bus bars 2 and 3 can be connected to capacitor elements 1 in a designed positional relation.

Connection portion 2a of bus bar 2 is disposed such that the L-shaped portion thereof extends along the upper part of one surface of capacitor element 1, and is connected to electrode 1a. Connection portion 3a of bus bar 3 is disposed such that the L-shaped portion thereof extends along the upper part of another edge surface of capacitor element 1, and is connected to electrode 1b.

As shown in FIG. 5, while bus bars 2 and 3 are connected to capacitor elements 1, terminal portions 2b and 3b of bus bars 2 and 3 extend perpendicularly to flat parts of the side surfaces of capacitor elements 1.

As shown in FIG. 5, bent portion 2e of terminal portion 2c of bus bar 2 steps over connection portion 3a so as not to contact connection portion 3a of bus bar 3. Bent portion 2e prevents short-circuit between bus bars 2 and 3.

Figure 6:
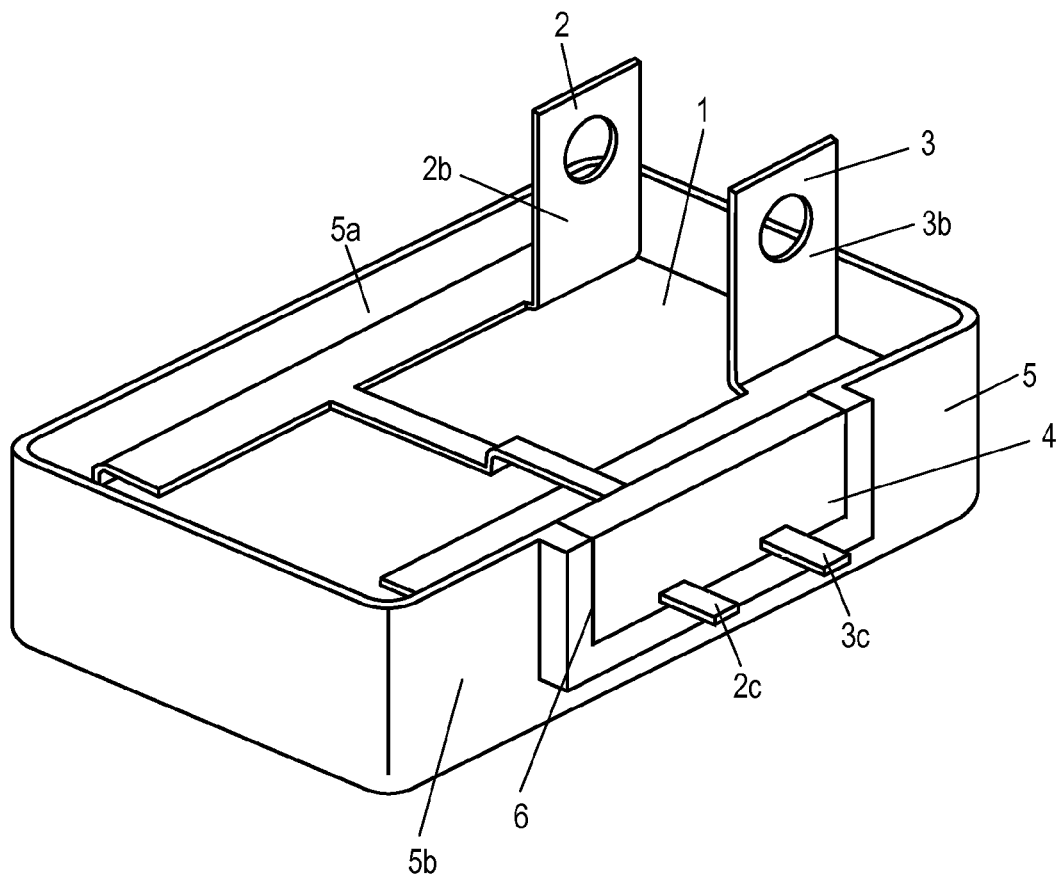
FIG. 6 is a perspective view of the case-mold-type capacitor in accordance with Embodiment 1.

FIG. 6 is a perspective view of case 5 accommodating therein two capacitor elements 1 connected to bus bars 2 and 3. Case 5 has a box shape having an upper surface opening. Capacitor element 1 is accommodated in housing portion 5a. Case 5 is made of resin. In accordance with Embodiment 1, similarly to sealing plate 4, case 5 is made of PPS.

Side wall 5b of case 5 has rectangular cutaway portion 6 provided therein. Cutaway portion 6 extends from the upper end to the vicinity of the lower end of the side wall. As shown in FIG. 6, sealing plate 4 is disposed at cutaway portion 6 and joined to case 5. Case 5 may be bonded to sealing plate 4 with, e.g. an adhesive.

As mentioned above, since cranked portion 2f of bus bar 2 is embedded in sealing plate 4, bus bar 2 is completely fixed to sealing plate 4. Therefore, capacitor element 1 connected to bus bar 2 is automatically positioned when sealing plate 4 is disposed to cutaway portion 6 of case 5, and can be disposed precisely at a predetermined position in housing portion 5a of case 5.

As shown in FIG. 6, sealing plate 4 has the same dimension and thickness as cutaway portion 6 of case 5. Therefore, upon being joined to case 5, sealing plate 4 becomes a part of side wall 5b of case 5 to seal cutaway portion 6 of case 5.

Mold resin 7 is input from the opening in the upper surface of case 5 while sealing plate 4 seals cutaway portion 6 of case 5, and is solidified, thereby providing case-mold-type capacitor 10 shown in FIG. 1. In case-mold-type capacitor 10, as shown in FIG. 1, mold resin 7 fills housing portion 5a so as to cover capacitor element 1 and parts of bus bars 2 and 3. Terminal portions 2b and 3b of bus bars 2 and 3 are exposed upward and led out of mold resin 7. Furthermore, tip ends of terminal portions 2c and 3c of bus bars 2 and 3 are led out and exposed to the outside of the case from side wall 5b of case 5 through sealing plate 4.

Sealing plate 4 is bonded to cutaway portion 6 by an adhesively bonding method using an adhesive. This prevents mold resin 7 from leaking out of a gap between sealing plate 4 and cutaway portion 6, when mold resin 7 is input into housing portion 5a of case 5. In accordance with Embodiment 1, since sealing plate 4 and terminal portions 2c and 3c of bus bars 2 and 3 are integrated with each other by insert-molding, a gap is hardly generated between terminal portions 2c and 3c of bus bars 2 and 3 and sealing plate 4. Therefore, mold resin 7 does not leak out of routes through which terminal portions 2c and 3c pass. Furthermore, in terminal portion 2c, cranked portion 2f complicates the route through which terminal portions 2c passes is complicated, thereby prevents leakage of mold resin 7 to the outside.

Case-mold-type capacitor 10 is used while terminal portions 2b, 2c, 3b, and 3c are connected to the external device.

Figure 13A:
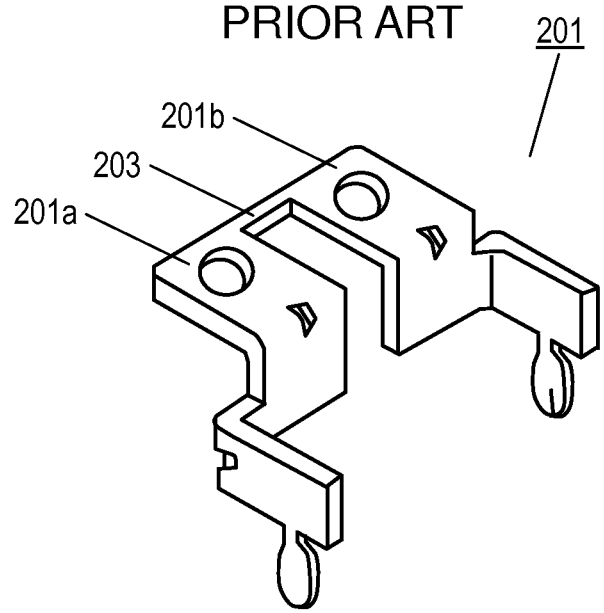
FIG. 13A is a perspective view of a bus bar of the conventional case-mold-type capacitor.
Figure 13B:
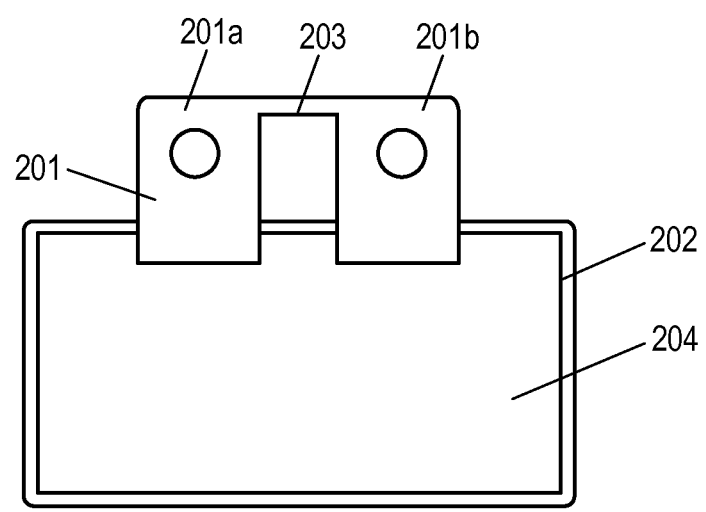
FIG. 13B is a top view of the case-mold-type capacitor including the bus bar shown in FIG. 13A

The technique disclosed in PTL2 shown in FIGS. 13A and 13B can improve dimensional accuracy between terminals of terminal portions 201a and 201b for external connection. However, the technique described in PTL2 cannot still suppress vertical displacement although it can suppress generation of two-dimensional displacement between terminal portions 201a and 201b. That is to say, in the technique disclosed in PTL2, common connection portion 203 is cut off and removed by a cutting tool, such as a nipper, and the impact of cutting-off and removing work may displace terminal portions 201a and 201b in the vertical direction. In addition, connection portion 203 to be finally cut off and removed needs to be provided. This increases material cost accordingly.

In case-mold-type capacitor 10 in accordance with Embodiment 1, bus bars 2 and 3 are connected to capacitor element 1 while being fixed to sealing plate 4. Consequently, the dimensional accuracy, after connection, between terminal portions 2c and 3c of bus bars 2 and 3 is extremely high both in the two-dimensional direction and the vertical direction. In addition, since sealing plate 4 is used as a part of side wall 5b of case 5, the dimensional accuracy between terminal portions 2c and 3c is high also in case-mold-type capacitor 10 as a final product. Thus, high reliability can be achieved.

Furthermore, unlike the case-mold-type capacitor disclosed in PTL2, removing of common connection portion 203 is not required, and, accordingly, material is not wasted. Furthermore, sealing plate 4 for fixing bus bars 2 and 3 is not a new member for fixing bus bars 2 and 3, but a part of side wall 5b of case 5. Therefore, the number of material members is not increased, and thus case-mold-type capacitor 10 is excellent in cost.

Exemplary Embodiment 2

Figure 7:
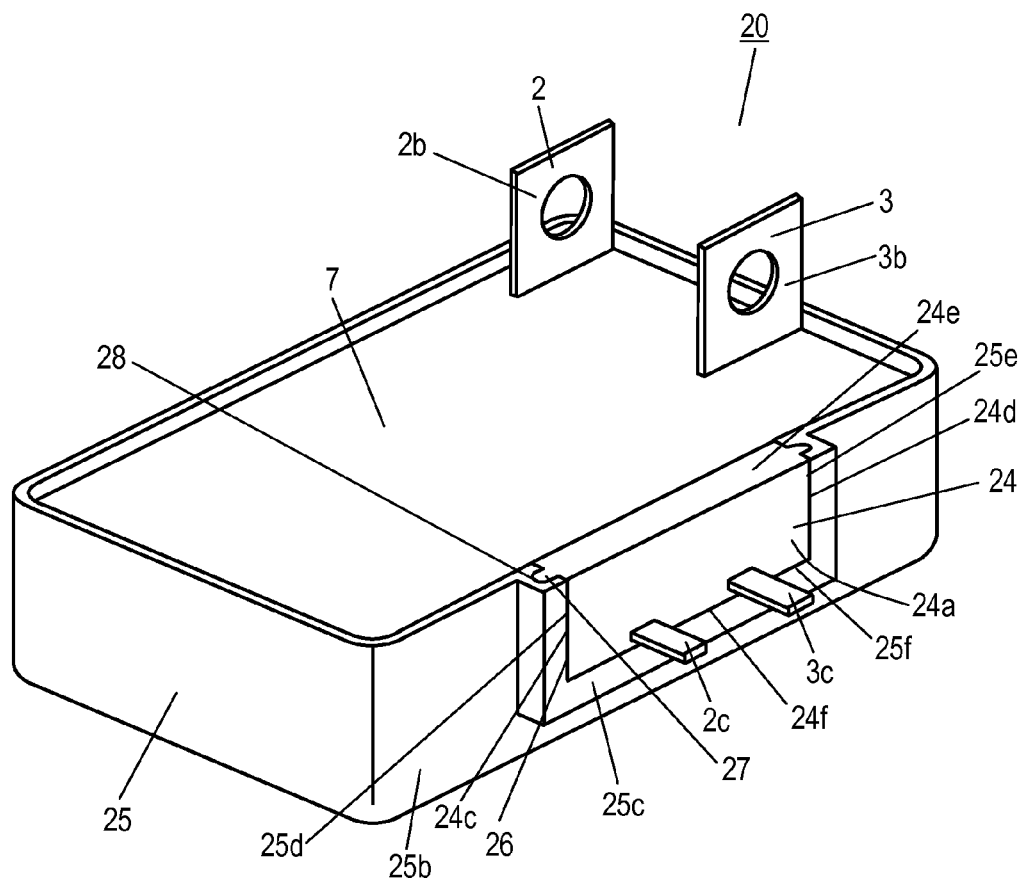
FIG. 7 is a perspective view of a case-mold-type capacitor in accordance with Exemplary Embodiment 2 of the present invention.
Figure 8:
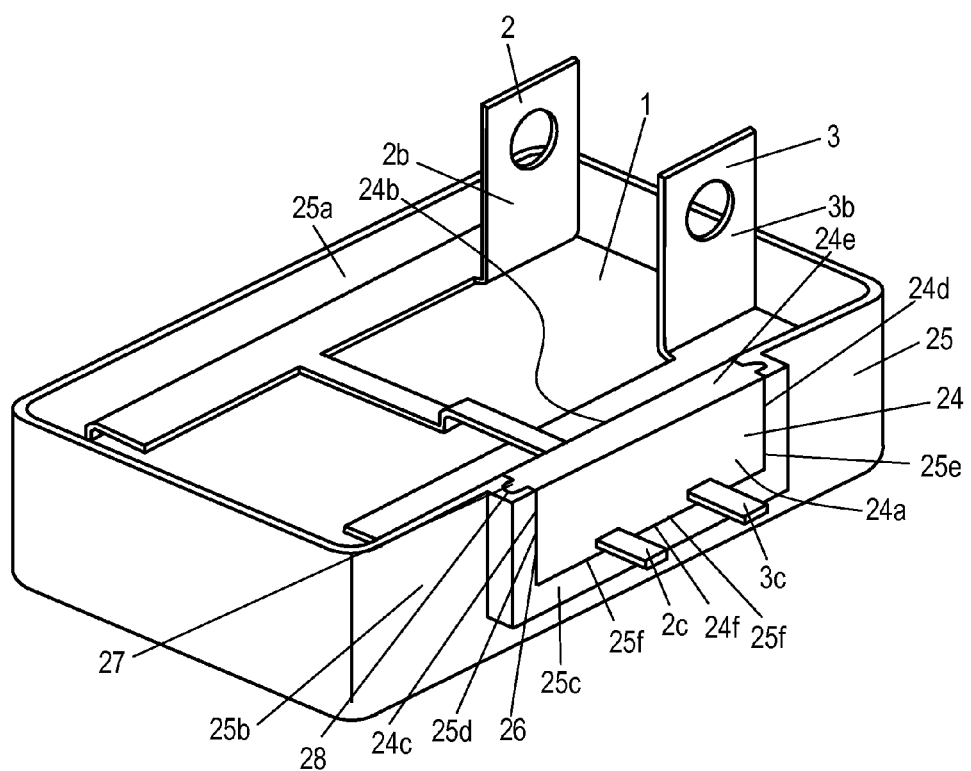
FIG. 8 is a perspective view of the case-mold-type capacitor in accordance with Embodiment 2.

FIG. 7 is a perspective view of case-mold-type capacitor 20 in accordance with Exemplary Embodiment 2 of the present invention. In FIG. 7, the components identical to those of case-mold-type capacitor 10 in accordance with Embodiment 1 shown in FIGS. 1 to 6 are denoted by the same reference numerals. Case-mold-type capacitor 20 in accordance with Embodiment 2 includes case 25 and sealing plate 24 instead of case 5 and sealing plate 4 of case-mold-type capacitor 10 in accordance with Embodiment 1 shown in FIGS. 1 to 6. FIG. 8 is a perspective view of case-mold-type capacitor 20 before being filled with mold resin 7.

As shown in FIGS. 7 and 8, case 25 and sealing plate 24 of case-mold-type capacitor 20 in accordance with Embodiment 2 have substantially the same shapes as case 5 and sealing plate 4 of case-mold-type capacitor 10 in accordance with Embodiment 1 shown in FIGS. 1 and 6. Sealing plate 24 is joined to case 25 such that sealing plate 24 becomes a part of side wall 25b of case 25. That is to say, side wall 25b of case 25 has therein cutaway portion 26 that is cut away from the upper end to the vicinity of the lower end. Sealing plate 24 is fitted and inserted into and joined to cutaway portion 26. Case 25 has edge 25c surrounding and facing cutaway portion 26. Edge 25c has a thickness locally larger than that of the other portions of case 25 so that edge 25c can be joined to sealing plate 24. The thickness of edge 25c is the same as that of sealing plate 24.

Sealing plate 24 is joined to edge 25c of case 25 by fitting a protrusion in a recess provided at portions of sealing plate 24 and edge 25c where sealing plate 24 contacts edge 25c.

Sealing plate 24 has main surfaces 24a and 24b opposite to each other through which terminal portions 2c and 3c of bus bars 2 and 3 pass, side edge surface 24c connected to main surfaces 24a and 24b, and side edge surface 24d opposite to side edge surface 24c. Edge 25c of case 25 has inner edge surfaces 25d and 25e that contact side edge surfaces 24c and 24d of sealing plate 24, respectively. Sealing plate 24 has protrusion 27 protruding outward from side edge surface 24c (24d). Protrusion 27 has a cross section having an arcuate shape. Side edge surfaces 24c and 24d of sealing plate 24 are two of four side edge surfaces 24c to 24f out of six surfaces of sealing plate 24. Side edge surfaces 24c and 24d of sealing plate 24 are surfaces other than main surfaces 24a and 24b through which terminal portions 2c and 3c of bus bars 2 and 3 pass. Side edge surface 24e opens upward as shown in FIGS. 7 and 8. Side edge surface 24f faces downward and contacts edge 25c provided at a periphery of cutaway portion 26 of case 25, as shown in FIGS. 7 and 8. Protrusion 27 is provided at side edge surfaces 24c, 24d, and 24f out of side edge surfaces 24c to 24f of sealing plate 24 other than side edge surface 24e facing upward in FIG. 8. Protrusion 27 extends from the upper end to the lower end of sealing plate 24.

Inner edge surface 25d of edge 25c provided at a periphery of cutaway portion 26 of case 25 has recess 28 provided therein. Recess 28 has a cross section having an arcuate shaped. Recess 28 also extends from the upper end to the lower end of cutaway portion 26, similarly to protrusion 27.

In FIG. 8, sealing plate 24 is fitted to be inserted into cutaway portion 26 downward from the upper side, so that protrusion 27 of sealing plate 24 is fitted into recess 28 of cutaway portion 26, thereby joining sealing plate 24 to cutaway portion 26.

Figure 9A:
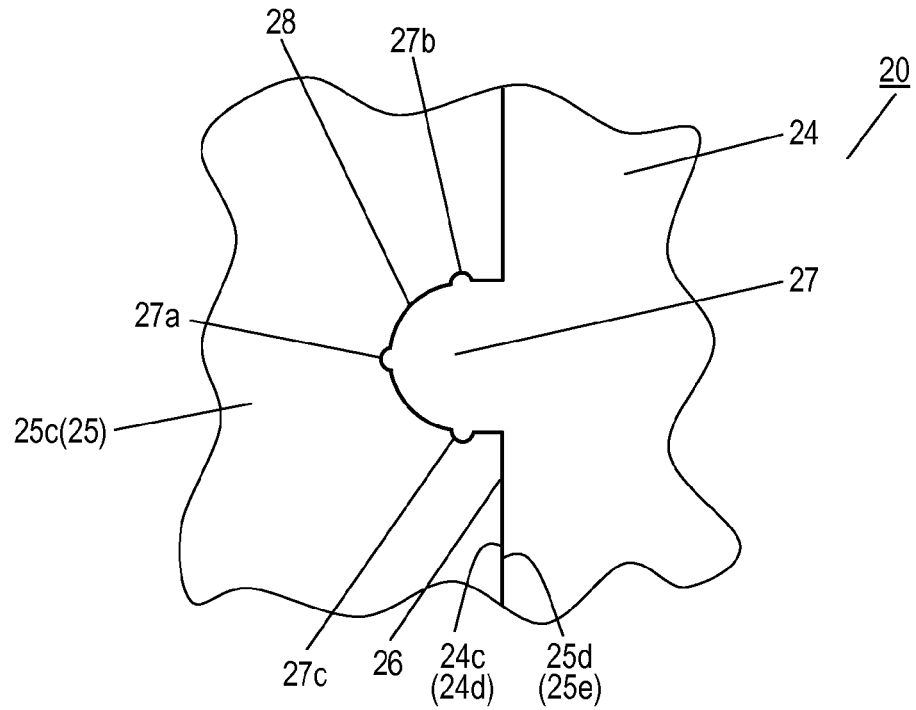
FIG. 9A is an enlarged view of the case-mold-type capacitor shown in FIG. 7.

FIG. 9A is an enlarged view of case-mold-type capacitor 20, and particularly shows a portion thereof shown in FIGS. 7 and 8 in which sealing plate 24 contacts edge 25c in the periphery of cutaway portion 26 of case 25 after sealing plate 24 is joined to cutaway portion 26.

Figure 9B:
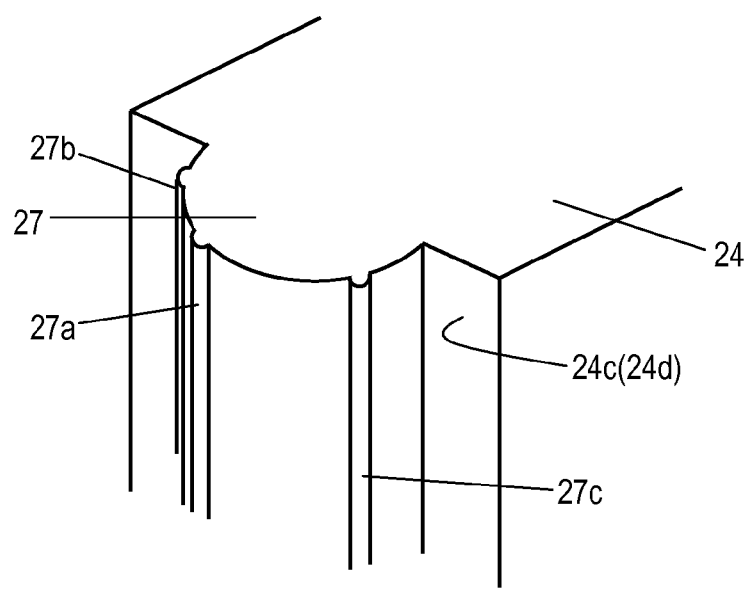
FIG. 9B is an enlarged view of the case-mold-type capacitor shown in FIG. 9A.

As shown in FIG. 9A, sealing plate 24 is joined to cutaway portion 26 by fitting protrusion 27 into recess 28. Sealing plate 24 includes rib 27a provided at a vertex of the arcuate shape of the cross section of protrusion 27, and ribs 27b and 27c provided at both sides near the root of the arcuate shape of the cross section of protrusion 27. FIG. 9B is an enlarged view of case-mold-type capacitor 20, and particularly shows side edge surface 24c of sealing plate 24. Ribs 27a to 27c of sealing plate 24 protrude slightly outward from the surface of protrusion 27. Ribs 27a to 27c extend from the upper end to the lower end of protrusion 27 of sealing plate 24.

Recess 28 does not have dents corresponding to ribs 27a to 27c. That is to say, when protrusion 27 is fitted into recess 28, ribs 27a to 27c are press-fitted into recess 28 so as to elastically contact recess 28. As a result, ribs 27a to 27c slightly penetrate into the wall surface of recess 28. After sealing plate 24 is joined to cutaway portion 26, larger pressure is applied to the vicinity of ribs 27a to 27c than the other portion of the ribs.

Ribs 27a to 27c are not provided at protrusion 27 on side edge surface 24f facing downward in FIG. 8 in protrusion 27 on side edge surfaces 24c, 24d, and 24f of sealing plate 24. Ribs 27a to 27c are provided at protrusion 27 on side edge surfaces 24c and 24d.

Mold resin 7 is input from an opening of the upper surface of case 25 shown in FIG. 8, and solidified, thereby, providing case-mold-type capacitor 20 shown in FIG. 7. In case-mold-type capacitor 20 shown in FIG. 7, mold resin 7 is filled into housing portion 25a (FIG. 8) so as to cover capacitor elements 1 and a part of bus bars 2 and 3. Terminal portions 2b and 3b of bus bars 2 and 3 are exposed upward and led out to the outside from mold resin 7. Furthermore, tip ends of terminal portions 2c and 3c of bus bars 2 and 3 are led out of side wall 25b of case 25 through sealing plate 24.

Case-mold-type capacitor 20 is used while terminal portions 2b, 2c, 3b, and 3c are connected to the external device.

Advantages of case-mold-type capacitor 20 in accordance with the present embodiment will be described below.

As shown in FIGS. 8 and 9A, in case-mold-type capacitor 20 in accordance with Embodiment 2, protrusion 27 provided at side edge surfaces 24c and 24d of sealing plate 24 are fitted into recess 28 provided in inner edge surfaces 25d and 25e of edge 25c in the periphery of cutaway portion 26 of case 25. When sealing plate 24 is fitted and inserted into cutaway portion 26 so as to seal housing portion 25a of case 25, it is possible to suppress leakage of mold resin 7 to the outside from a small gap between sealing plate 24 and cutaway portion 26 when terminal portions 2c and 3c of bus bars 2 and 3 are led out to the outside from the side surface of case 25 and housing portion 25a is filled with mold resin 7. That is to say, this is because when protrusion 27 is filled in recess 28, positioning accuracy between sealing plate 24 and cutaway portion 26 can be improved, cutaway portion 26 can be sealed with sealing plate 24 in an accurate position, and the protrusion and the recess lengthen and complicate a route of leakage of mold resin 7. Furthermore, fitting of the protrusion and the recess makes joining of case 25 and sealing plate 24 stronger. As a result, possibility of leakage of mold resin 7 to the outside can be dramatically suppressed.

Furthermore, sealing plate 24 may have plural protrusions 27, and edge 25c of case 25 may have plural recesses 28 therein into which protrusions 27 are fitted, respectively. Thus, side edge surfaces 24c, 24d, and 24f of sealing plate 24, and inner edge surface 25d of edge 25c of case 25 have a wave shape. This configuration provides the same advantage as in case-mold-type capacitor 20 in accordance with Embodiment 2.

In case-mold-type capacitor 20 in accordance with Embodiment 2, ribs 27a, 27b, and 27c which are press-fitted when sealing plate 24 is fitted and inserted into cutaway portion 26 are integrated with sealing plate 24.

As mentioned above, protrusion 27 is press-fitted into recess 28 such that ribs 27a, 27b, and 27c penetrate the wall surface of recess 28 of cutaway portion 26. Therefore, even if mold resin 7 infiltrates into a small gap between sealing plate 24 and cutaway portion 26, ribs 27a, 27b, and 27c can prevent mold resin 7 from leaking to the outside. Therefore, ribs 27a, 27b, and 27c suppress the possibility of leakage of mold resin 7 in case-mold-type capacitor 20 in accordance with Embodiment 2.

In case-mold-type capacitor 20 according to Embodiment 2, protrusion 27 has a cross section which has an arcuate shape. If the cross section of protrusion 27 does not have the arcuate shape but has another shape, such as a rectangular shape, stress is locally applied to, for example, the vicinity of corners of a rectangular shape of recess 28 due to pressure applied to case 25 from ribs 27a, 27b, and 27c. As a result, case 25 may be broken. Also when mold resin 7 receives heat from the outside and expands due to the heat, case 25 may be broken. Therefore, in case-mold-type capacitor 20, the cross section of protrusion 27 has the arcuate shape so as to disperse the pressure applied to case 25, thereby suppressing the possibility of the breakage.

As described above, case-mold-type capacitor 20 according to Embodiment 2 can suppress the possibility of leakage of mold resin 7 to the outside of case 25 when case 25 is filled with mold resin 7, thus providing case-mold-type capacitor 20 with high reliability.

Figure 9C:
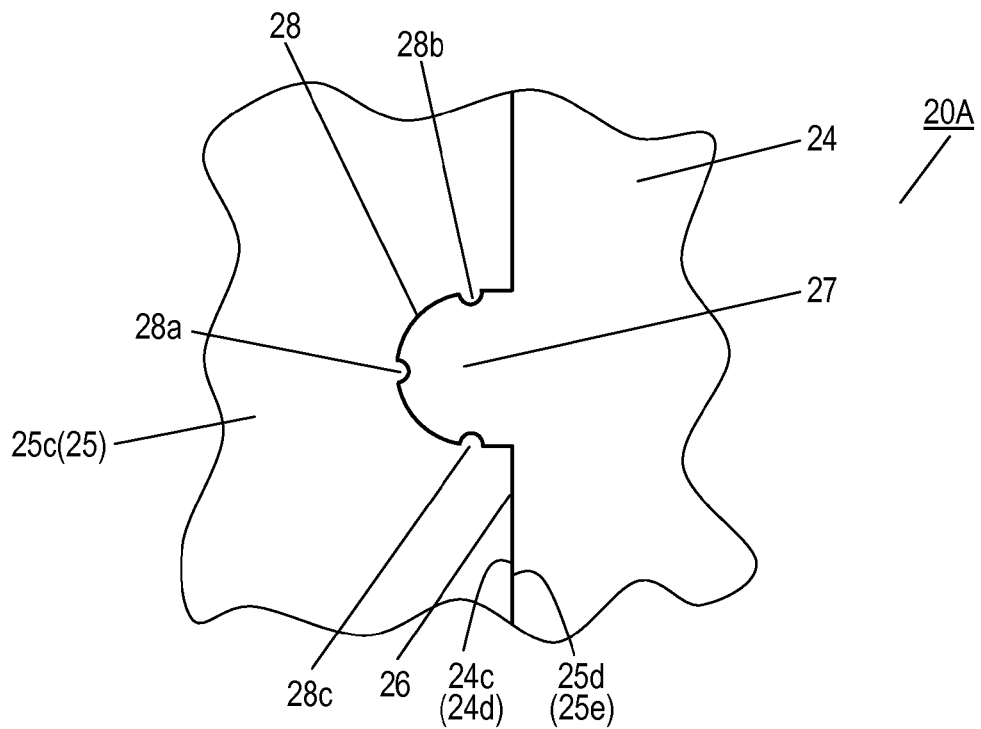
FIG. 9C is an enlarged view of another case-mold-type capacitor in accordance with Embodiment 2.
Figure 9D:
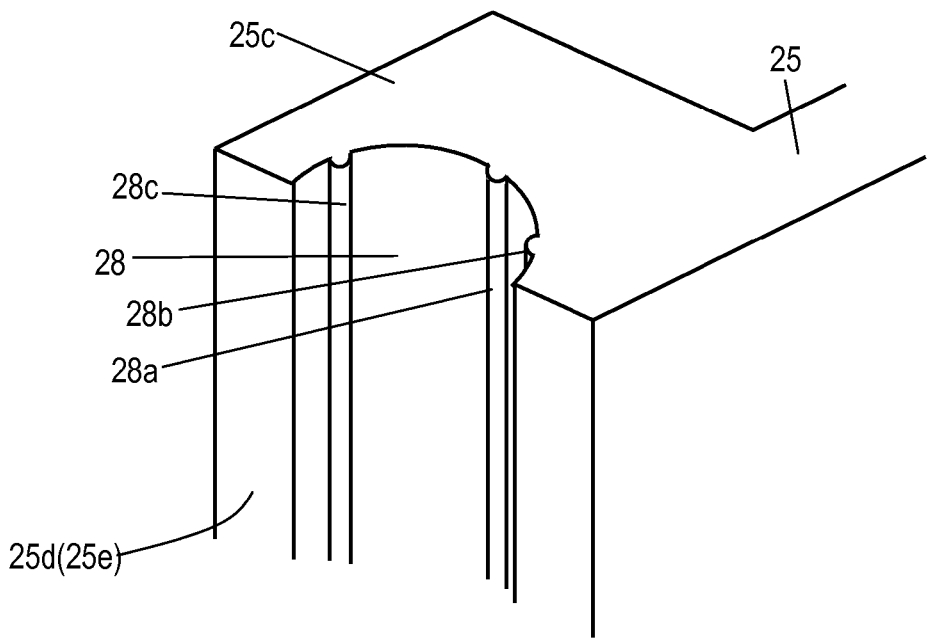
FIG. 9D is an enlarged view of the case-mold-type capacitor shown in FIG. 9C.

FIGS. 9C and 9D are enlarged views of another case-mold-type capacitor 20A in accordance with Embodiment 2. In FIGS. 9C and 9D, components identical to those of case-mold-type capacitor 20 shown in FIGS. 9A and 9B are denoted by the same reference numerals. In case-mold-type capacitor 20, protrusion 27 has ribs 27a, 27b, and 27c. In case-mold-type capacitor 20A shown in FIGS. 9C and 9D, protrusion 27 of sealing plate 24 does not has ribs 27a, 27b, and 27c. Instead, case 25 has ribs 28a, 28b, and 28c slightly protruding from the surface of recess 28 of edge 25c in the periphery of cutaway portion 26. As shown in FIG. 9D, ribs 28a to 28c extend from the upper end to the lower end of protrusion 27 of case 25.

On the other hand, protrusion 27 does not have dents therein corresponding to ribs 28a to 28c. That is to say, when protrusion 27 is fitted into recess 28, ribs 28a to 28c elastically contact protrusion 27. As a result, ribs 28a to 28c slightly penetrate a wall surface of protrusion 27. After sealing plate 24 is joined to cutaway portion 26, larger pressure is applied to the vicinity of ribs 28a to 28c than the other portion.

In case-mold-type capacitor 20A, ribs 28a, 28b, and 28c are integrally provided with edge 25c of case 25.

As mentioned above, protrusion 27 is press-fitted into recess 28 such that ribs 28a, 28b, and 28c penetrate the surface of protrusion 27 of sealing plate 24. Therefore, even if mold resin 7 infiltrates into a small gap between sealing plate 24 and cutaway portion 26, ribs 28a, 28b, and 28c can prevent mold resin 7 from leaking to the outside. Therefore, ribs 28a, 28b, and 28c suppress the possibility of leakage of mold resin 7 in case-mold-type capacitor 20A.

In case-mold-type capacitor 20A according to Embodiment 2, protrusion 27 has a cross section which has an arcuate shape. If the cross section of protrusion 27 does not have the arcuate shape but has another shape, such as a rectangular shape, stress is locally applied to, for example, the vicinity of corners of a rectangular shape of recess 28 due to pressure applied to case 25 from ribs 28a, 28b, and 28c. As a result, case 25 may be broken. Also when mold resin 7 receives heat from the outside and expands due to the heat, case 25 may be broken. Therefore, in case-mold-type capacitor 20A, the cross section of protrusion 27 has the arcuate shape so as to disperse the pressure applied to case 25, thereby suppressing the possibility of the breakage.

As described above, case-mold-type capacitor 20A according to Embodiment 2 can suppress the possibility of leakage of mold resin 7 to the outside of case 25 when case 25 is filled with mold resin 7, thus providing case-mold-type capacitor 20A with high reliability.

Figure 10:
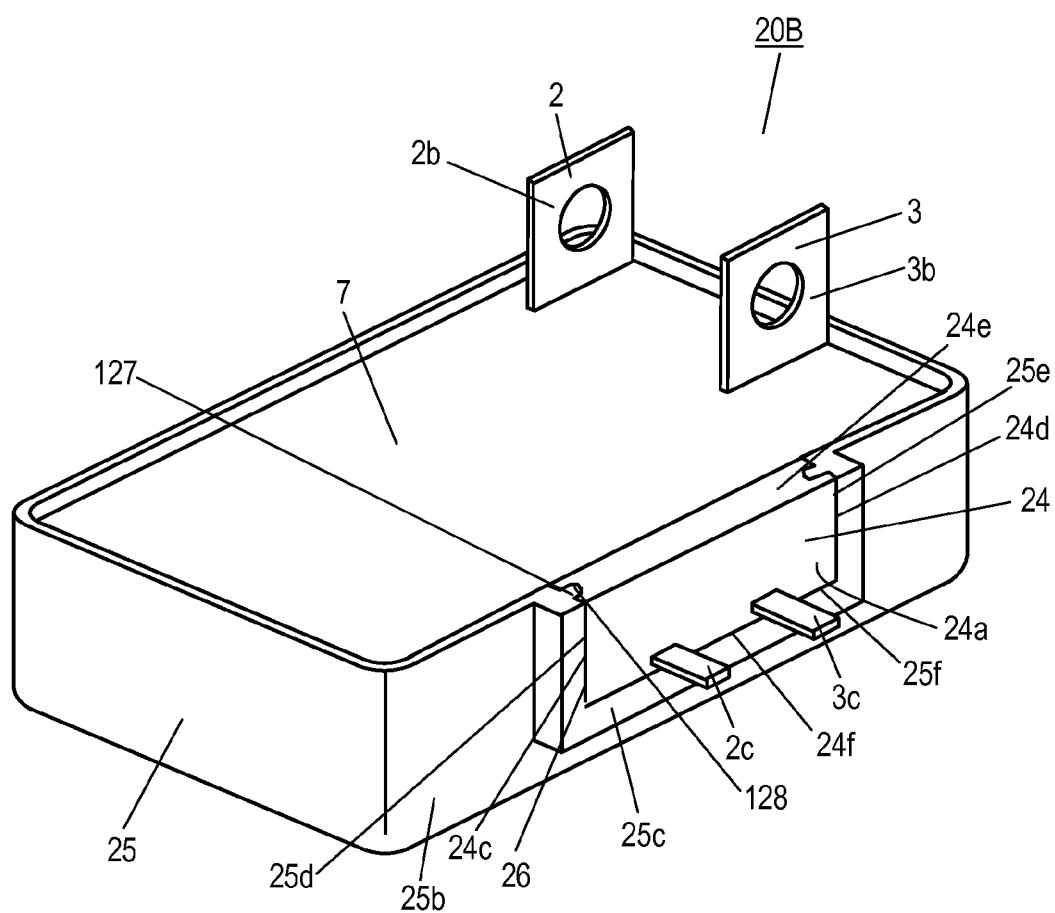
FIG. 10 is a perspective view of still another case-mold-type capacitor in accordance with Embodiment 2.

FIG. 10 is a perspective view of still another case-mold-type capacitor 20B in accordance with Embodiment 2. In FIG. 10, components identical to those of case-mold-type capacitor 20 shown in FIG. 7 are denoted by the same reference numerals. In case-mold-type capacitor 20 shown in FIG. 7, protrusion 27 is provided at side edge surfaces 24c, 24d, and 24f of sealing plate 24, recess 28 is provided in inner edge surfaces 25d, 25e, and 25f of edge 25c in the periphery of cutaway portion 26 of case 25, and protrusion 27 is fitted into recess 28. In case-mold-type capacitor 20B shown in FIG. 10, recess 128 is provided in side edge surfaces 24c, 24d, and 24f of sealing plate 24, case 25 has protrusion 127 which protrudes from inner edge surfaces 25d, 25e, and 25f of edge 25c in the periphery of cutaway portion 26. Similarly to protrusion 27 and recess 28 shown in FIG. 7, protrusion 127 is fitted into recess 128 shown in FIG. 10, and thereby sealing plate 24 is joined to edge 25c of case 25 so as to seal cutaway portion 26. Thus, the same advantage can be obtained.

Figure 11A:
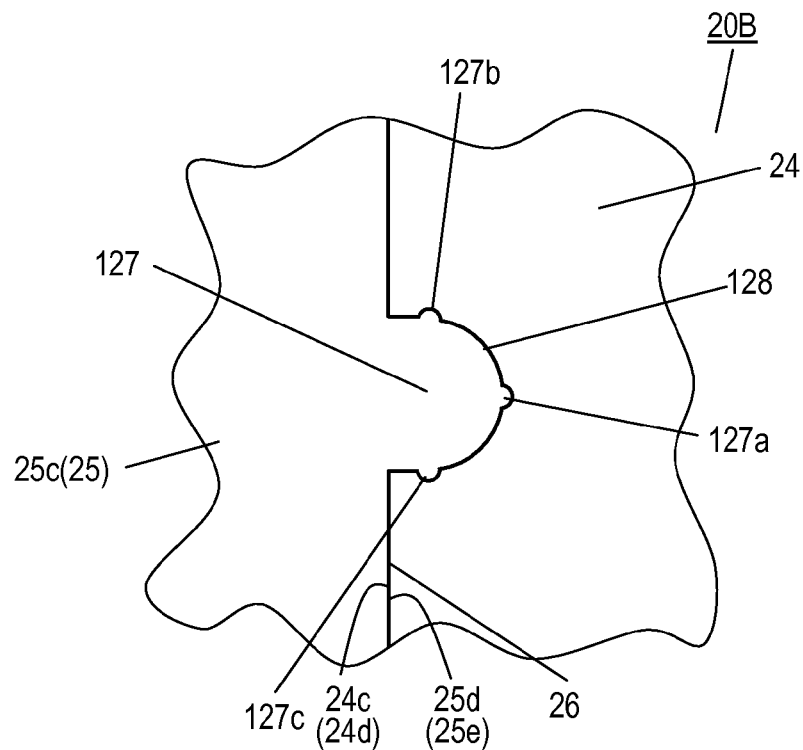
FIG. 11A is an enlarged view of the case-mold-type capacitor shown in FIG. 10.
Figure 11B:
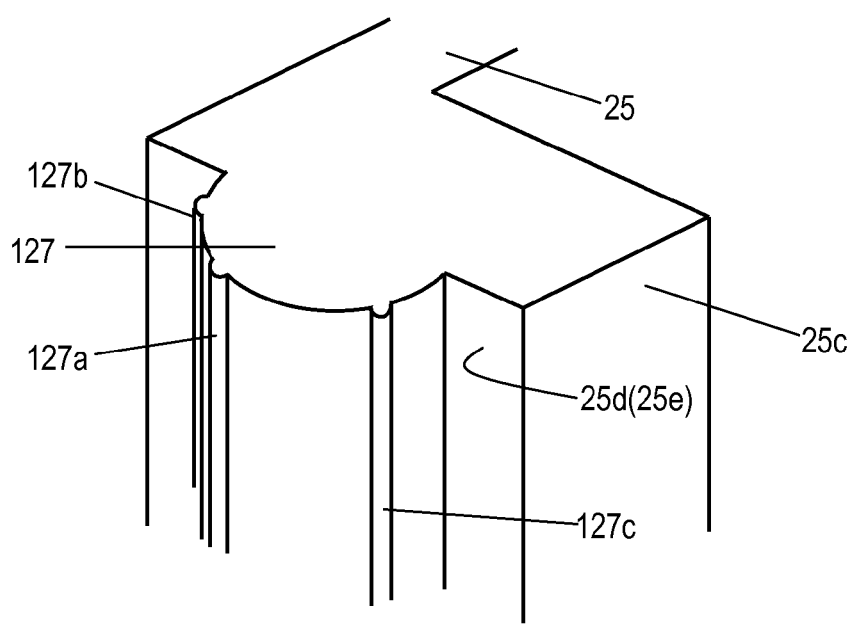
FIG. 11B is an enlarged view of the case-mold-type capacitor shown in FIG. 10.

FIGS. 11A and 11B are enlarged views of case-mold-type capacitor 20B. In FIGS. 11A and 11B, components identical to those of case-mold-type capacitor 20 shown in FIGS. 9A and 9B are denoted by the same reference numerals. Protrusion 127 shown in FIG. 10 has ribs 127a to 127c having the same shape and at the same positions as ribs 27a to 27c shown in FIGS. 9A and 9B, and the same advantage can be exhibited.

Figure 11C:
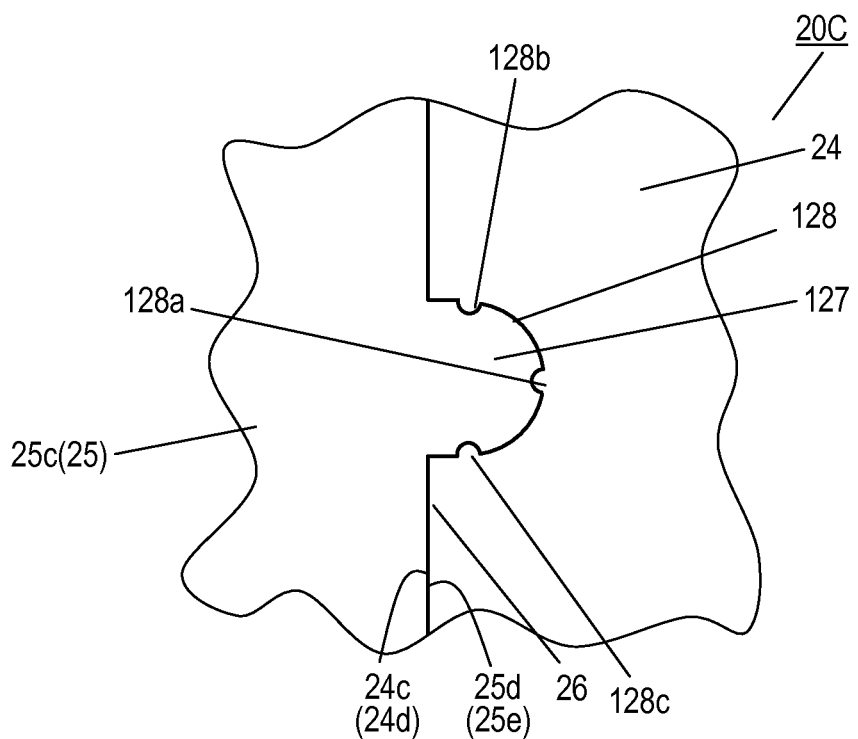
FIG. 11C is an enlarged view of a further case-mold-type capacitor in accordance with Embodiment 2.
Figure 11D:
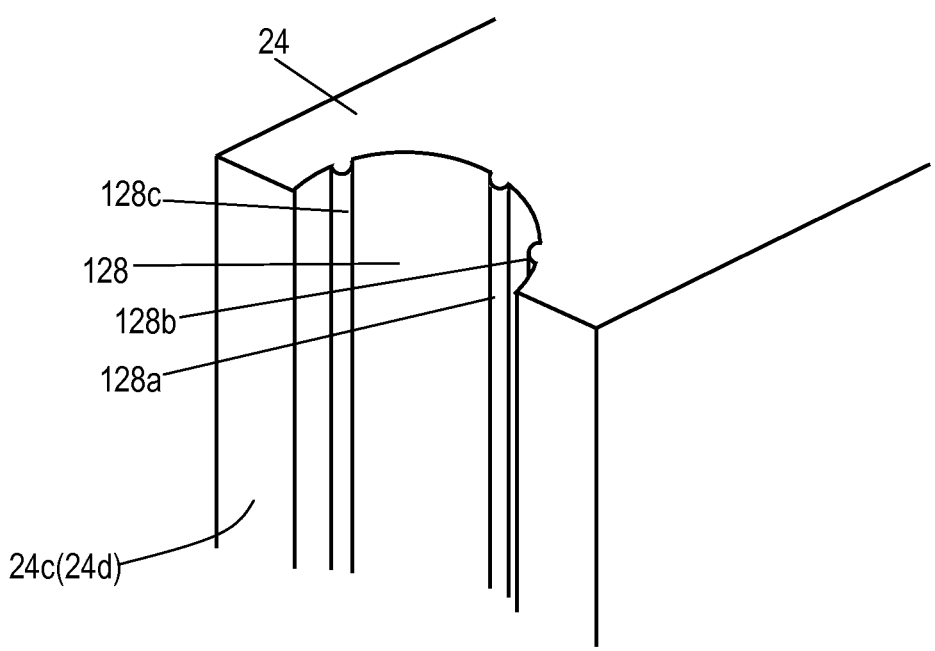
FIG. 11D is an enlarged view of the case-mold-type capacitor shown in FIG. 11C.
Figure 12:
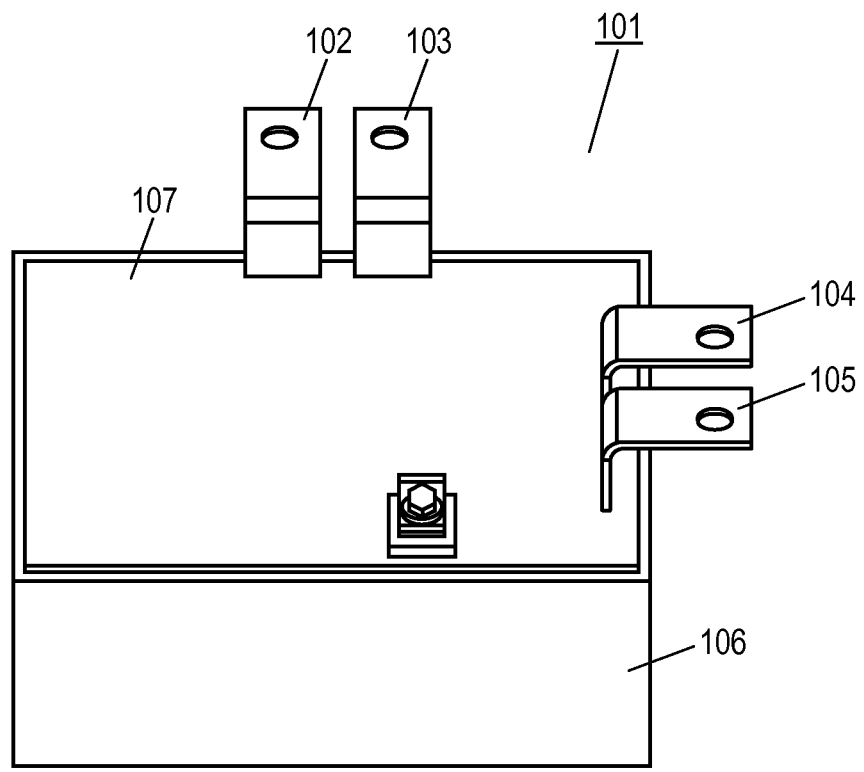
FIG. 12 is a perspective view of a conventional case-mold-type capacitor.

FIGS. 11C and 11D are enlarged views of further case-mold-type capacitor 20C in accordance with Embodiment 2. In FIGS. 11C and 11D, components identical to those of case-mold-type capacitor 20 shown in FIGS. 9A and 9B and case-mold-type capacitor 20B shown in FIGS. 11A and 11B are denoted by the same reference numerals. In case-mold-type capacitor 20B, ribs 127a to 127c are provided at protrusion 127. In case-mold-type capacitor 20C shown in FIGS. 11C and 11D, ribs 127a to 127c are not provided at protrusion 127 of case 25. Instead, sealing plate 24 has ribs 128a to 128c slightly protruding from the surface of recess 128. As shown in FIG. 11D, ribs 128a to 128c extend from the upper end to the lower end of recess 128 of sealing plate 24. Ribs 128a to 128b have the same advantage as those of ribs 28a to 28c shown in FIGS. 9C and 9D.

In Embodiments 1 and 2, terms, such as "upper side" and "lower side", indicating directions indicates relative directions depending only upon relative positional relations between components, and do not indicate absolute directions, such as a vertical direction and a horizontal direction. Therefore, upon being used actually, case-mold-type capacitors 10, 20, 20A, 20B, and 20C are not necessarily required to be disposed such that the openings of cases 5 and 25 are directed upward in the vertical direction as shown in FIG. 1 and FIG. 7. For example, the capacitors may be disposed such that the openings are directed downward in the vertical direction or directed horizontally.

Furthermore, in case-mold-type capacitors 10, 20, 20A, 20B, and 20C in accordance with Embodiments 1 and 2, terminal portions 2c and 3c for measuring a voltage applied to capacitor element 1 pass though sealing plates 4 and 24, and terminal portions 2b and 3b for allowing an electric current to flow from the outside to capacitor element 1 are exposed from mold resin 7. Bus bars 2 and 3 do not necessarily have terminal portions 2b and 3b, and an electric current from the outside may flow to capacitor element 1 via terminal portions 2c and 3c.

INDUSTRIAL APPLICABILITY

A case-mold-type capacitor in accordance with the present invention has extremely high dimensional accuracy in the relative positional relation of terminal portions configured to be connected to an external device, and has high reliability. Thus, the case-mold-type capacitor is suitable as a capacitor for hybrid vehicles that are used in various outside environments and strongly require high reliability.

REFERENCE MARKS IN THE DRAWINGS 1 capacitor element
1a electrode (first electrode)
1b electrode (second electrode)
2 bus bar (first bus bar)
2a connection portion (first connection portion)
2b terminal portion
2c terminal portion (first terminal portion)
2e bent portion
2f cranked portion
3 bus bar (second bus bar)
3a connection portion (second connection portion)
3b terminal portion
3c terminal portion (second terminal portion)
4 sealing plate
5 case
6 cutaway portion
7 mold resin
10 case-mold-type capacitor
20 case-mold-type capacitor
25 case
24 sealing plate
26 cutaway portion
27 protrusion
27a, 27b, 27c rib
28 recess

The invention claimed is:

1. A case-mold-type capacitor comprising:
   a capacitor element including a capacitor element body, a first electrode, and a second electrode, the capacitor element body having a first surface, a second surface opposite the first surface, and a side surface connected to the first surface and the second surface, the first electrode being provided on the first surface of the capacitor element body, the second electrode being provided on the second surface of the capacitor element body;
   a first bus bar including a first connection portion and a first terminal portion for external connection, the first connection portion being connected to the first electrode of the capacitor element, the first terminal portion being connected to the first connection portion;
   a second bus bar including a second connection portion and a second terminal portion for external connection, the second connection portion being connected to the second electrode of the capacitor element, the second terminal portion being connected to the second connection portion;
   a case accommodating the capacitor element, the first connection portion of the first bus bar, and the second connection portion of the second bus bar therein, the case having a side wall which has a cutaway portion provided therein;
   a sealing plate joined to the case so as to seal the cutaway portion; and
   a mold resin filling the case so as to cover the capacitor element, the first connection portion of the first bus bar, and the second connection portion of the second bus bar,
   wherein the first bus bar and the second bus bar pass through the sealing plate and are fixed to the sealing plate such that the first terminal portion of the first bus bar and the second terminal portion of the second bus bar are exposed to outside of the case,
   wherein the second connection portion includes a portion provided on the side surface of the capacitor element body, and
   wherein the first terminal portion extends from the first connection portion toward the second electrode and steps over the portion of the second connection portion so as not to contact the second connection portion.

2. The case-mold-type capacitor according to claim 1, wherein the first connection portion and the second connection portion are formed unitarily with the sealing plate by insert molding.

3. The case-mold-type capacitor according to claim 1, wherein the first connection portion includes a cranked portion partially bent, the cranked portion being embedded in the sealing plate.

4. The case-mold-type capacitor according to claim 1,
   wherein the capacitor element has a first flat surface and a second flat surface opposite to the first flat surface,
   wherein the first connection portion extends slenderly in a longitudinal direction, and includes a first L-shaped portion such that a cross section of the first L-shaped portion substantially perpendicular to the longitudinal direction has an L-shape, wherein the first connection portion is disposed such that the first L-shaped portion extends along the first electrode and the first flat surface of the capacitor element, wherein the second connection portion extends slenderly in the longitudinal direction, and includes a second L-shaped portion such that a cross section of the second L-shaped portion substantially perpendicular to the longitudinal direction has an L-shape, and wherein the second connection portion is disposed such that the second L-shaped portion extends along the second electrode and the first flat surface of the capacitor element.

5. The case-mold-type capacitor according to claim 1, wherein the second connection portion of the second bus bar has a part having a cross section having an L-shape provided along the second electrode and the side surface of the capacitor element body, and wherein the first terminal portion extends from the first connection portion toward the second electrode and steps over the part having the L-shape of the second connection portion so as not to contact the second connection portion.

\* \* \* \* \*